United States Patent
Bick et al.

(10) Patent No.: US 11,111,587 B2
(45) Date of Patent: Sep. 7, 2021

(54) CHEMICALLY RESISTANT, OXIDIC ELECTROCATALYST FOR OXYGEN EVOLUTION DURING ALKALINE WATER ELECTROLYSIS

(71) Applicant: Forschungszentrum Jülich GmbH, Jülich (DE)

(72) Inventors: Daniel Bick, Aachen (DE); Ilia Valov, Aachen (DE); Theodor Schneller, Aachen (DE); Rainer Waser, Aachen (DE)

(73) Assignee: Forschungszentrum Jülich GmbH, Jülich (DE)

( * ) Notice: Subject to any disclaimer, the term of this patent is extended or adjusted under 35 U.S.C. 154(b) by 220 days.

(21) Appl. No.: 16/499,537

(22) PCT Filed: Mar. 28, 2018

(86) PCT No.: PCT/EP2018/057880
§ 371 (c)(1),
(2) Date: Sep. 30, 2019

(87) PCT Pub. No.: WO2018/178135
PCT Pub. Date: Oct. 4, 2018

(65) Prior Publication Data
US 2020/0040473 A1 Feb. 6, 2020

(30) Foreign Application Priority Data
Mar. 29, 2017 (DE) .......................... 102017205339.9

(51) Int. Cl.
*H01M 8/04* (2016.01)
*C25B 11/077* (2021.01)
(Continued)

(52) U.S. Cl.
CPC ............ *C25B 11/0773* (2021.01); *C25B 1/04* (2013.01); *C25B 11/051* (2021.01);
(Continued)

(58) Field of Classification Search
CPC ....................................................... H01M 4/02
See application file for complete search history.

(56) References Cited

U.S. PATENT DOCUMENTS

| | | | |
|---|---|---|---|
| 2005/0026006 A1* | 2/2005 | Haile | ....................... H01M 4/90 429/442 |
| 2009/0286680 A1 | 11/2009 | Hirano et al. | |

(Continued)

OTHER PUBLICATIONS

Godula-Jopek et al. "Hydrogen Production: By Electrolysis," Wiley VCH-Verlag (2014), pp. 124-128.
(Continued)

*Primary Examiner* — Jacob B Marks
(74) *Attorney, Agent, or Firm* — Christopher Jan Korff; Rankin Hill & Clark LLP (57) ABSTRACT

Disclosed is a biphasic electrically conductive perovskite-based mixed oxide of the structure $ABO_3$ with A=Ba, and B=Co, comprising additionally 5-45 at %, preferably 15 to 30 at %, particularly preferably 25 at % $Co_3O_4$ (at % Co based on the total number of Co atoms in the perovskite $ABO_3$ and 0.5 to 0.3 at %, preferably 1 to 2.5 at %, particularly preferably 2 at % (wherein the at % are referred to the total number of B cations in the perovskite $ABO_3$) Ti as dopant. Preferably, the mixed oxide has the stoichiometric formula $BaCo_{1-x}Ti_xO_{3-\delta}:Co_3O_4$ with x=0.005 to 0.03, preferably x=0.01 to 0.025, particularly preferably x=0.02, wherein δ defines the vacancies in the perovskite structure and is in the range of about 0.1 to 0.8, preferably 0.3 to 0.7, particularly preferably about 0.5 to 0.6. Further disclosed are a catalyst and an anode comprising the mixed oxide, the use of the catalyst in alkaline water electrolysis or in metal-air
(Continued)

batteries, the use of the mixed oxide for the preparation of an anode for alkaline water electrolysis or metal-air batteries. Further, manufacturing processes for a precursor solution for the mixed oxide and for the inventive anode are disclosed, as well as an amorphous mixed oxide having a Co:Ba ratio of about 2:1 and a TTB (Tetragonal Tungsten-Bronze)-like near structure obtainable by using the mixed oxide according to the invention as catalyst in the oxygen evolution reaction of alkaline water electrolysis, whereby said amorphous product is formed by leaching out Ba.

20 Claims, 1 Drawing Sheet (51) Int. Cl.
| | |
|---|---|
| C25B 1/04 | (2021.01) |
| H01M 4/88 | (2006.01) |
| H01M 4/90 | (2006.01) |
| H01M 12/06 | (2006.01) |
| C25B 11/051 | (2021.01) |
| C25B 11/069 | (2021.01) |
| H01M 4/86 | (2006.01) |

(52) U.S. Cl.
CPC ......... *C25B 11/069* (2021.01); *H01M 4/8825* (2013.01); *H01M 4/8882* (2013.01); *H01M 4/9016* (2013.01); *H01M 12/06* (2013.01); *H01M 2004/8684* (2013.01)

(56) References Cited

U.S. PATENT DOCUMENTS

| | | |
|---|---|---|
| 2016/0134002 A1 | 5/2016 | Mizuno et al. |
| 2016/0348257 A1 | 12/2016 | Yagi et al. |
| 2017/0211193 A1 | 7/2017 | Miyazaki et al. |

OTHER PUBLICATIONS

P. Kurzweil and O. Dietlmeier, "Elektrochemische Speicher," Springer Verlag (2015) pp. 440-441.

McCrory et al. "Benchmarking Hydrogen Evolving Reaction And Oxygen Evoving Reaction Electrocatalysts for Solar Water Splitting Devices," J. Am. Chern. Soc., 2015, 137, pp. 4347-4357.

Grimaud et al., "Double perovskites as a family of highly active catalysts for oxygen evolution in alkaline solution," Nature Communications 4:2439 (2013), seven pages.

Suntivich et al., "A Perovskite Oxide Optimized for Oxygen Evolution Catalysis from Molecular Orbital Principles," Science vol. 334, Dec. 9, 2011, pp. 1383-1385.

Hong et al., "Toward the rational design of non-precious transition metal oxides for oxygen electrocatalysis," Energy Environ. Sci., 2015, 8, pp. 1404-1427.

May et al., "Influence of Oxygen Evolutions during Water Oxidation on the Surface of Perovskite Oxide Catalysts," J. Phys. Chem. Lett. 2012, 3, pp. 3264-3270.

Bick et al., "Stability and Degradation of Perovskite Electrocatalysts for Oxygen Evolution Reaction," Electrochimica Acta 218 (2016) pp. 156-162.

Fabbri et al., "Developments and perspectives of oxide-based catalysts for the oxygen evolution reaction," Catal. Sci. Technol. 2014, 4, pp. 2800-3821.

José Ramón Galán-Mascaros, "Water Oxidation at Electrodes Modified with Earth-Abundant Transition-Metal Catalysts," ChemElectroChem 2015, 2, pp. 37-50.

Hasenkox et al., "Metal Propionate Synthesis of Magnetoresistive La1-x(Ca,Sr)xMnO3 Thin Films," J. Am. Ceram. Soc., vol. 80, No. 10, pp. 2709-2713.

Hasenkox et al., "Influence of Precursor Chemistry on the Formation of MTiO3 (M=Ba, Sr) Ceramic Thin Films," J. Sol-Gel Sci. Technol., 12, (1998) pp. 67-79.

Halder et al., "Crystallization Temperature Limit of (Ba,Sr)TiO3 Thin Films Prepared by a Non Oxocarbonate Phase Forming CSD Route," Journal of Sol-Gel Science and Technology, 33 (2005) Abstract only, one page.

Müller, "Structural and Electronic Investigations of Highly Oxygen Deficient Mixed Ion Electron Conductors BaxSr1-xCo0.8Fe0.2O3-c (BSCF)," Dissertation RWTH Aachen, 2010, 74 pages.

Hong et al., "Descriptors of Oxygen-Evolution Activity for Oxides: A Statistical Evaluation," Journal of Physical Chemistry, vol. 120, No. 1, Dec. 30, 2015, pp. 78-86.

International Search Report for corresponding PCT/EP2018/057880, dated Jun. 6, 2018, three pages.

Bick et al., "Degradation Kinetics during Oxygen Electrocatalysis on Perovskite-Based Surfaces in Alkaline Media," Langmuir, 2018, vol. 34, No. 4, pp. 1347-1352.

\* cited by examiner

CHEMICALLY RESISTANT, OXIDIC ELECTROCATALYST FOR OXYGEN EVOLUTION DURING ALKALINE WATER ELECTROLYSIS

FIELD THE INVENTION

The present invention relates to an electrocatalyst for the oxygen evolution in alkaline water electrolysis. In particular, it relates to an electrically conductive mixed oxide based on $BaCoO_{3-\delta}$, a catalyst for the oxygen evolution reaction in alkaline water electrolysis, an anode comprising the mixed oxide according to the invention, the use of the anode in water electrolysis or in metal-air-batteries, the use of the mixed oxide for the production of the mentioned anodes as well as a method for obtaining the precursors of the mixed oxide for subsequent wet chemical deposition of the mixed oxide on suitable electrically conductive substrates. Furthermore, the use of the anodes according to the invention in water electrolysis and in metal-air-batteries is claimed.

The electrically conductive biphasic mixed oxide according to the invention stands out by high chemical stability combined with high current density. It is based on a perovskite structure ($BaCoO_{3-\delta}$) which is modified with $Co_3O_4$ and doped with Ti. The mixed oxide according to the invention can preferably be described by the formula $BaCo_{1-x}Ti_xO_{3-\delta}:Co_3O_4$ with x=0.005 to 0.03, preferably x=0.01 to 0.025, particularly preferably x=0.02. δ defines the vacancies in the perovskite structure and is in the range of about 0.1 to 0.8, preferably 0.3 to 0.7, particularly preferably about 0.5 to 0.6.

Furthermore, a decomposition product of said mixed oxide is disclosed, which is formed in the course of the oxygen evolution reaction and, according to the non-binding assumption of the inventors, is the actual catalytically active species of this material system in the oxygen evolution reaction of alkaline water electrolysis.

BACKGROUND OF THE INVENTION

The large-scale storage of electrical energy is one of the most important and difficult tasks in managing the transition from fossil fuels to clean and sustainable energy supply. Electrochemical reactions are a conceptually simple way to efficiently provide and store electrical energy by using chemical bonds. Energy can be stored in particular by electrochemical cleavage of water to form hydrogen and oxygen. The electrical energy required for this can be obtained e.g. by photovoltaic or other environmentally friendly, sustainable power variants such as electric power from hydropower or wind. The later reaction of these two gases in a fuel cell can therefore provide clean electrical energy, the only by-product being water.

The energy efficiency of the electrolysis of water is over 70%. Several plant manufacturers (e.g. Electrolyser Corp., Brown Boveri, Lurgi, De Nora, Epoch Energy Technology Corp.) offer large electrolyzers with an even higher degree of efficiency—over 80%. Since the electrolyte concentration and the temperature of an electrolyte solution have a great impact on the cell resistance and thus on the energy costs, in modern systems a 25 to 30 percent potassium hydroxide solution is used, the temperature is about 70-90° C. The current density is about 0.15-0.5 A/cm², the voltage at about 1.90 V. For the production of 1 m³ hydrogen (at atmospheric pressure), modern systems require an electrical energy of 4.3-4.9 kWh. A large pressure electrolyzer from Lurgi has a capacity of 760 m³/h hydrogen at about 3.5 MW (stack power) and about 4.5 MW input power (alternating voltage). By electrocatalysts (for cathodes e.g. Ni—Co—Zn, Ni—Mo, for anodes: nickel-lanthanum-perovskite, nickel-cobalt-spinel), the overvoltage can be reduced by about 80 mV.

In the case of an alkaline electrolyzer generally at a direct voltage of at least 1.5 volt hydrogen is formed at the cathode and oxygen is formed at the anode. Potash lye (potassium hydroxide solution, KOH) with a concentration of 20-40% serves as electrolyte. A gas-tight membrane, the so-called diaphragm, allows the transport of OH⁻ ions, but at the same time prevents the mixing of the resulting product gases. The electrodes used are so-called "DSA electrodes" (dimensionally stable anodes, mostly titanium electrodes with a ruthenium oxide coating).

These are expanded metals that are coated with a noble metal catalyst oxide—e.g. ruthenium- or iridium oxide, But there are also systems with Raney-nickel-catalysts in a gas diffusion electrode. Alkaline electrolyzers are in widespread use worldwide.

However, the kinetic limitations of these oxygen-based electrochemical reactions are often quite high, preventing the development of efficient technologies such as solar fuels, fuel cells, electrolyzers and metal-oxygen batteries so far.

The oxygen evolution reaction (Oxygen Evolution Reaction, OER) which takes place at anode during the electrolysis of water can basically take place both in acidic environment $$2H_2O \rightarrow 4H^+ + 4e^- + O_2\uparrow$$

and in alkaline environment $$4OH^- \rightarrow 2H_2O + 4e^- + O_2\uparrow.$$

The oxygen evolution reaction (OER), like the oxygen reduction reaction (ORR), exhibits very unfavorable slow kinetics in both alkaline and acidic environments.

The main advantage of the alkaline variant is that cheaper alternatives can be used instead of expensive noble metal catalysts, while in the acidic version only a few very expensive electrode materials exhibit adequate stability, such as oxides of Pt, Ir and Ru (DOCUMENT 10, p. 1803). However, many of the known cheaper catalysts, which are described below, dissolve in alkaline environment. Therefore, for some time there has been a great interest in the development of cost-effective catalysts for the OER in alkaline medium.

The standard Nernst potential of the oxygen half-cell reaction is 1.23 V vs. reversible hydrogen electrode (RHE) defined by the hydrogen standard electrode potential at a given pH. At pH=0, this potential is referred to as the standard hydrogen electrode scale. The OER is thermodynamically favored above the potential, the ORR below. However, since the kinetics of the OER are very unfavorable, a large deviation from the half-cell potential is needed (referred to as overpotential) to generate a noticeable current with corresponding mass transfer at the electrode surface (DOCUMENT 7, p. 1405).

The best-known oxide catalysts for OER today include nickel-iron-cobalt oxides. These require overpotentials of about 0.4 V at 10 mA $cm_{geo}^2$. (DOCUMENT 7, p. 1405). In general, metal alloys, oxides or nitrides are used as catalysts.

For the oxygen evolution reaction (OER) during alkaline water electrolysis, electrocatalysts are required which exhibit high chemical stability in highly concentrated alkaline solutions and during oxygen evolution at low material costs. The overpotential of the oxygen evolution reaction should be kept as low as possible in order to achieve high current densities in the electrolysis mode.

For the cost-efficient use of alkaline water electrolysis alternatives to the currently used electrocatalysts are needed. Currently, the metals Ni, Co, Fe and Raney nickel as well as combinations of these metals (DOCUMENT 1) and the noble metals Ir and Ru and their oxides are used as electrocatalysts in the evolution of oxygen (DOCUMENT 2, DOCUMENT 3). These are applied to the anode of the electrolyzer in the form of layers. The overpotential of oxygen evolution is lowest for the metals mentioned. On base metal electrodes, on the other hand, oxygen evolution occurs at higher overpotentials and is associated with shorter service lives of the anodes. The material costs for electrodes with low overpotentials and long service lives are therefore very high.

Oxidic catalysts are an alternative to the base metal electrodes as they have very low overpotentials for oxygen evolution.

Transition-metal oxides such as perovskites of the formula $ABO_3$, which are composed of rare earth and alkaline earth elements (A) and transition metal cations (B), are of particular interest here, as they have intrinsic activities comparable to those of "gold standard" OER catalysts such as $IrO_2$ and $RuO_2$ (DOCUMENT 4, p. 2).

Numerous perovskites are discussed in the literature as potential candidates for the oxygen evolution reaction. Well-known examples of very active perovskite catalysts are $Pr_{0.5}Ba_{0.5}CoO_3$ (PBCO) (DOCUMENT 4) and $Ba_{0.5}Sr_{0.5}Co_{0.8}Fe_{0.2}O_{3-\delta}$ (BSCF) (DOCUMENT 5).

A review article on the variety of perovskites and descriptors for their oxygen evolution activity in alkaline water electrolysis has recently been published by Hong et al. (DOCUMENT 6). Examples of perovskites mentioned therein are $LaCu_{0.5}Mn_{0.5}O_3$, $La_{0.5}Ca_{0.5}CoO_{3-\delta}$, $LaNiO_3$, $LaCoO_3$ (LCO), $LaMnO_3$ (LMO), $La_{0.4}Sr_{0.6}CoO_{3-\delta}$ (LSC46), $Ba_{0.5}Sr_{0.5}Co_{0.8}Fe_{0.2}O_{3-\delta}$ (BSCF82), $SrCo_{0.8}Fe_{0.2}O_{3+\delta}$ (SCF82), $LaNiO_3$, $LaFeO_3$, $LaMnO_3$, $LaCrO_3$, $La_{0.4}Sr_{0.6}CoO_{3-\delta}$ (LSC46), $GdBaCo_2O_{5+\delta}$ (GBCO), $SmBaCo_2O_{5+\delta}$ (SBCO), $HoBaCo_2O_{5+\delta}$ (HBCO), $PrBaCo_2O_{5+\delta}$ (PBCO). The stoichiometric notation of PBCO and other perovskites in the literature is to some extent differently chosen, but means the same structure, viz. $PrBaCo_2O_{5+\delta}$ and $Pr_{0.5}Ba_{0.5}CoO_3$.

The poor chemical stability in alkaline solution and under the operating conditions of alkaline water electrolysis (60-80° C., ≤30 bar, high salt concentration in the electrolyte) of most oxide catalysts is the main problem in their application.

Depending on the perovskites used, it comes to a leaching of metal ions out of the perovskite lattice and, frequently, to an amorphization of the electrocatalyst (s. e.g. DOCUMENT 9, DOCUMENT 7, DOCUMENT 8).

Another disadvantage of the oxide electrocatalysts is the usually poor electrical conductivity (DOCUMENT 2). This causes perovskites to be often mixed with electrically or conically conductive binders such as Nafion® (sulfonated tetrafluoropolyethylene polymer), whereby conductivity is increased, but chemical stability is lowered.

The inventors have already proposed a model for explaining the stability and degradation of perovskite electrocatalysts at OER and developed a service life test (ESLT, End of Service Life Test) in order to be able to compare different oxide OER catalysts (DOCUMENT 11, especially p. 157, right column). The decomposition of PBCO during OER was shown to be related to defect chemistry (DOCUMENT 11).

DOCUMENT 14 discloses a water vapor electrolysis cell consisting of an anode layer, a cathode layer and a proton-conducting oxide electrolyte layer interposed therebetween. In concrete terms, a catalyst for the water electrolysis having a variable composition of Ba and Co and having a perovskite structure is disclosed, which can be admixed with cobalt oxide, among others. Further possible oxides as additives for the catalyst are silver oxide, nickel, oxide, iron oxide and a composite oxide such as e.g. nickel ferrite and cobalt ferrite. Neither a doping with Ti nor the simultaneous enrichment with $Co_3O_4$ and doping with Ti is described with regard to the catalyst.

Furthermore, DOCUMENT 14 discloses a proton-conducting electrolyte consisting of a perovskite of extremely variable compositions, wherein, besides Zr, Ce and Sc, also Ti is mentioned on the B-site. Furthermore, according to DOCUMENT 14, it is preferred that at least a portion of the A site and the B site is substituted with one or more elements selected from La, Ce, Pr, Nd, Sm, Gd, Eu, Yb, Sc, Y, In, Ga, Fe, Co, Ni, Zn, Ta and Nb. DOCUMENT 14 particularly recommends perovskites of the types Sr—Zr—Y, Sr—Zr—Ce—Y, Ca—Zr—In, La—Sc, Sr—Ce—Yb and La—Sr—Ti—Nb as electron conducting electrolytes.

DOCUMENT 15 is a review article on the developments and perspectives of oxide-based catalysts for the OER. As semiconducting oxides, which can be used as OER catalysts, those with medium bonding strength for oxygen, namely $RuO_2$, $Co_3O_4$, NiO, $PtO_2$, $SrCoO_3$, $LaNiO_3$, $SrCoO_3$ and $SrNiO_3$, are particularly recommended.

DOCUMENT 16 is also a review article on water oxidation reaction. Technologically relevant catalysts for energy generation from abundantly occurring metals are discussed, especially $Co_3O_4$ and $CoO_x$ besides iron oxides, nickel oxides, manganese oxides and mixed oxides such as $Ni_{0.9}Fe_{0.1}O_x$ and $NiFe_2O_4$. Perovskites are also mentioned, especially Ba—Sr—Co—Fe-perovskites. According to DOCUMENT 16, these undergo structural changes from crystalline to amorphous state during water oxidation, which could be ascribed to a transformation of the local structure from an octahedron connected via the corners to an octahedron connected via the edges and, according to DOCUMENT 16, could be associated with increased activity.

DOCUMENT 17 concerns the synthesis of magnetoresistive $La_{1-x}(Ca,Sr)_xMnO_3$ films from metal propionates. The propionates are obtained from the corresponding acetates, respectively. In concrete terms, propionates of La, Mn, Ca and Sr are disclosed. The synthesis takes place by dissolving the metal acetates in a mixture of propionic acid and propionic acid anhydride by heating under reflux. The resulting solution is applied to a Pt—$TiO_2$—Si carrier e.g. by spin-coating and then calcined at 550-750° C. The films have a thickness of about 50 nm. They can also be produced by multiple application.

DOCUMENT 18 discloses the production of thin $BaTiO_3$ or $SrTiO_3$ films from the corresponding acetates, propionates, 2-methylpropionates and 2-ethylhexanoates as A-site precursors and stabilized Ti-tetrabutoxide as titanium precursor materials by a chemical solution deposition process. The applied films are pre-dried at 250 to 450° C. before calcination.

REFERENCES

DOCUMENT 1: A. Godula-Jopek et al (Ed.), Hydrogen Production: by Electrolysis, Wiley VCH-Verlag (2014), pp. 124-128

DOCUMENT 2: P. Kurzweil and O. Dietlmeier, Elektrochemische Speicher, Springer Verlag (2015), pp. 440-442.

DOCUMENT 3: C. C. L. McCrory et a J. Am. Chem. Soc. 137, 4347-4357 (2015)

DOCUMENT 4: A. Grimaud et al., Nature Communications 4: 2439 (2013)
DOCUMENT 5: J. Suntivich et al., Science 334, 1383 (2011)
DOCUMENT 6: W. T. Hong et al., J Phys. Chem. C 120, 78-8 (2016)
DOCUMENT 7: W. T. Hong et al., Energy Environ. Sci. 8, 1404-1427 (2015)
DOCUMENT 8: K. J. May et al., Phys. Chem. Lett. 3, 3264-3270 (2012)
DOCUMENT 9: J. R. Galán-Mascarós, ChemElectroChem, 2: 37-50 (2015)
DOCUMENT 10. E. Fabbri et al., Catal. Sci. Technol. 4, 3800-3821 (2014)
DOCUMENT 11: D. S. Bick et al., Electrochimica Acta 218 (2016) 156-162
DOCUMENT 12: S. Helder et al., J. Sol-Gel Sci. Tech. 33, 299-306, 2005
DOCUMENT 13: D. N. Müller, "Strukturelle und elektronische Untersuchungen am hock sauerstoffdefizMren Mischleiter $Ba_xSr_{1-x}Co_{0.8}Fe_{0.2}O_{3-\delta}$ (BSCF)", Dissertation RWTH Aachen, 2010
DOCUMENT 14: US 2017/0211193
DOCUMENT 15: F. Fabbri et al., Catal. Sci. Technol., 2014, 4, 3800-3821
DOCUMENT 16: J. R. Galán-Mascaros, ChemElectroChem 2015, 2, No. 1, 37-50
DOCUMENT 17: U. Hasenkox et al., J. Am. Ceram. Soc., 1997, 80, 2739-2713
DOCUMENT 18: U. Hasenkox et al., J. Sol-Gel Sci, Technol., 1998, 12, 67-69

Object of Invention

The object of the invention, in view of the disadvantages of the known oxide catalysts, is to provide a catalyst having high chemical stability for the oxygen evolution reaction in the alkaline water electrolysis, which operates at the lowest possible overpotential and is cost-effective, as well as to provide a process for obtaining its precursors.

SOLUTION OF THE PROBLEM

The problem is solved by the electrically conductive mixed oxide according to claim 1. Preferred embodiments are defined in claims 2 and 3. Claim 4 relates to a catalyst for the oxygen evolution reaction, comprising the mixed oxide according to the invention. Claims 5 and 6 define anodes according to the invention comprising the mixed oxide. Claim 7 relates to the use of these anodes in alkaline water electrolysis or in metal-air batteries. Claim 8 relates to the use of the mixed oxide according to the invention for the production of an anode for the purposes mentioned. Claims 9 to 11 define a production method for precursors of the mixed oxide according to the invention and claims 12 to 17 a method for the production of an anode. Claim 18 defines an amorphous mixed oxide having a ratio of CoBa of about 2:1 and a TTB (Tetragonal Tungsten Bronze)-like near structure, obtainable by using the electrically conductive perovskite-based mixed oxide according to one of claims 1 to 3 as catalyst in the oxygen evolution reaction of alkaline water electrolysis, wherein the said amorphous product is formed by teaching out Ba.

This amorphous mixed oxide is an amorphous reaction product of the electrically conductive perovskite-based mixed oxide according to the invention according to one of claims 1 to 3, having a Co:Ba ratio of 2:1 and a TTB (Tetragonal Tungsten Bronze)-like near structure, obtainable by using the mixed oxide as a catalyst in the oxygen evolution reaction of alkaline water electrolysis, wherein the said amorphous product being formed by leaching out Ba.

In prior art processes, the oxide catalyst is often prepared in a solid-state reaction by milling together stoichiometric amounts of the corresponding metal oxides and sintering in the air. The anodes for the OER are then prepared by drop casting a mixed oxide-containing ink onto an electrode made of amorphous carbon (acetylene black with Nafion®) (DOCUMENT 4, DOCUMENT 8).

Also used is a nitrate combustion method, a coprecipitation method or the Pechini method (DOCUMENT 8).

As substrates for oxidic catalysts of the OER, Pt(111), Au(111) and nickel as well as nickel doped with iron (DOCUMENT10) are mentioned in the literature in addition to the above amorphous carbon. Usually, a titanium substrate is used. Iron treated (passivated) with conc. nitric acid, gold, platinum or zinc is also used as anode material. Metal foams, e.g. made of nickel, are common as well as substrate for the anode. There are many geometries for electrolyzers and correspondingly many different anode geometries.

The perovskite-based, electrically conductive, biphasic mixed oxide according to the invention has a structure $ABO_3$ with A=Ba and B=Co, and additionally comprises 5-45 at %, preferably 15 to 30 at % particularly preferably 25 at % $Co_3O_4$ (at % of Co based on the total number of all Co atoms in $ABO_3$) and 0.5 to 3 at %, preferably 1 to 2.5 at %, particularly preferably 2 at %, (wherein the at % are based on the total number of B-cations in $ABO_3$) of at least one further element C (dopant), preferably Ti.

The mixed oxide according to the invention comprises an electrically conductive perovskite phase $ABO_3$, in particular $BaCoO_3$. The inventors have carried out experiments with other perovskites such as e.g. $PrCoO_3$, $BaSrCoFeO_3$ and the known $PrBaCoO_3$ (PBCO) as well as pure $BaCoO_3$. Thereby, it has been shown that, due to the biphasic perovskite $BaCoO_3+Co_3O_4$, the best results by far are achieved in the OER. The electrical conductivity of the perovskite is further increased by the addition of $Co_3O_4$. The addition of $Co_3O_4$ results in a biphasic mixed oxide with the first phase being $BaCoO_3$ and the second phase being $Co_3O_4$.

In addition, the dissolution process of the perovskite in the alkaline electrolysis medium, that is, the leaching out of metal ions, is slowed down significantly by the doping according to the invention with the element C, in particular Ti. The doping serves to adjust the oxygen stoichiometry, that is, oxygen vacancies are generated by the doping element. An exact illustration of the resulting rearrangements of the perovskite crystal structure can be found in DOCUMENT 11, the contents of which are included here in full. In particular, reference is made to p. 111, FIG. 9 of DOCUMENT 11. According to the invention, the doping element has to be an element which can easily assume the oxidation state +4 and whose atomic radius fits into the crystal lattice. Although $Ti^{4+}$ is relatively large, it works surprisingly well according to the invention. Experiments with $Hf^{4+}$ have yielded less good catalysts. Therefore, Ti is preferred as dopant.

The mixed oxide according to the invention which is particularly preferably can be described by the stoichiometric formula $BaCo_{1-x}Ti_xO_{3-\delta}:Co_3O_4$ with x=0.005 to 0.03, preferably x=0.01 to 0.025, particularly preferably x=0.02.

$\delta$ defines the oxygen vacancies in the perovskite structure. The mixed oxide according to the invention particularly preferably has the formula $BaCo_{0.98}Ti_{0.02}O_{3-\delta}:Co_3O_4$. The mixed oxide according to the invention is thus an oxygen-deficient mixed conductor. $\delta$ means that the oxide has oxygen vacancies. According to the invention, $\delta$ is higher than 0 and less than about 0.8. Values of about 0.2 to about 0.8, preferably about 0.3 to about 0.7 or particularly preferably about 0.5 to about 0.6 are possible.

While most important non-transition metal oxides have only one oxidation state (a significant exception being tin oxide), the opposite is true for transition metals. This facilitates the formation of oxygen vacancies (point defect). When an oxygen atom is removed from the crystal, electrons left behind by it can be taken up by the metal cations and the vacancy thus can be stabilized. Due to the large variety of cations that can be used to occupy the A and B sites of perovskites it was possible to find combinations that allow the perovskite structure to accommodate high oxygen non-stoichiometries. Due to these high concentrations of oxygen vacancies a high ionic conductivity is achieved, whereby perovskites could be developed, which are designated very good mixed conductors.

The perovskite phase of the $BaO$—$Bi_2O_3$ system can be considered as a mixed conductor. The highest electronic conductivity was found for a composition of $Ba_{0.67}(Bi_2O_3)_{0.33}$, for which a pure perovskite phase was identified that corresponds to the stoichiometry $BaBiO_{2.5}$. Here, the number of oxygen vacancies $\delta$ consequently is 0.5. This corresponds to a perovskite structure in which one-sixth of all oxygen sites are unoccupied. Values of $\delta=0.8$ can be achieved in BSCF5582 according to DOCUMENT 13. Values above 0.8, on the other hand, usually lead to a destabilization of the crystal. For stoichiometric BSCF, $\delta=0$, that is, there are no oxygen vacancies. Also, a high concentration of vacancies does not necessarily lead to an ordering of the vacancies in perovskites, which would generally reduce ionic conductivity (DOCUMENT 13).

Although amorphization takes place within a few seconds during the oxygen evolution reaction with the inventive catalyst as the anode material, this, surprisingly, does not affect the positive electrochemical properties of the electrocatalyst. After less than 5% of the life time of the catalyst, the complete catalyst layer has already changed into the amorphous state.

It has been shown by experiments of the inventors that the inventive combination of doping of the perovskite with Ti with the addition of $Co_3O_4$ prevents the leaching of the cations in the OER.

Perovskites generally degrade by losing A-cations by leaching. This is accompanied by the amorphization of the mixed oxide. Surprisingly, the biphasic doped mixed oxide according to the invention achieves a stable state during the decomposition. This state can be described as an amorphous oxide with distinctive near structure. Crystals generally have long symmetry chains. By this periodicity interferences can be observed for example in the x-ray structure analysis. If this periodicity is broken, there are no longer any interferences in the X-ray structure analysis. The arrangement according to the invention means a range of less than 100 nm. This near structure according to the invention is related to the Tetragonal Tungsten Bronze (Tetragonal Tungsten Bronze TTB), In this near structure, Co-atoms are found in distinct $CoO_6$ octahedra and additionally form tetrahedral gaps. Ba can be on 2 sites in this near structure: one site is leached out during the decomposition, the other remains occupied. In experiments conducted by the inventors, it has been shown that about 60 at % of the original Ba remains in the material. Starting from an atomic ratio CoBa 4:3 in the original mixed oxide, the stable decomposition product therefore contains Co and Ba in an atomic ratio 2:1 in the amorphous phase. The inventors assume, without being bound by this assumption, that this stable amorphous intermediate is the actual catalytically active species of this material system in the OER. This decomposition product of the biphasic electrically conductive mixed oxide according to the present invention is claimed in claim 17.

Chemically stable means, in the context f the invention, that the teaching out of Ba is greatly slowed down, the catalytic properties remain constant over the entire decomposition process and the ESLT up to the complete decomposition of the layer results in the longest possible operating times/100 nm (in our laboratory test). The slower the dissolution, the more stable the film (with constant catalysis behavior at the same time).

Thus, the invention provides a chemically stable alternative for oxidic electrocatalysts which simultaneously has a low overpotential and a high current density in the alkaline electrolysis of water.

The catalyst according to the invention comprises the above mixed oxide and optionally further common suitable additives such as Nafion®, but surprisingly shows very good activity and stability especially without such additives. Therefore, according to the invention, preferably no such additive is used. The mixed oxide according to the invention is preferably applied on a suitable electrically conductive electrode substrate material in a wet-chemical process described below to produce the anode according to the invention.

The electrically conductive substrate may be any conventional substrate used for anodes in the CER and may have any conventional size and shape, e.g. sheet metal, lattice, foam.

In the present specification, a Si(100) wafer coated with a $TiO_2$ adhesion layer and a polycrystalline Pt(111) layer is used to investigate the catalyst properties in a laboratory scale. Also, other conventional adhesive layers are possible, e.g. TiN and/or $AlO_x$. The orientation of the Si wafer e.g. is (100), but other oriented wafers can also be used. Si wafers are drawn single crystals. Thus, there are only oriented cuts of it. The Si serves as a shaping underlayer, on which, by means of the adhesive layer, the Pt layer can be applied. On the Si wafer, the Pt layer is formed in a usual manner, in particular by sputtering, e.g. magnetron sputtering (PVD, physical vapour deposition). In order to be able to carry out comparable tests, according to the invention Pt(111) layers are used, which are obtained by applying Pt on Si(100) wafers by magnetron sputtering and then increasing their orientation by annealing. The decisive factor is that the applied Pt layer is dense and smooth. These methods are known in the prior art, e.g. from DOCUMENT11 and references specified therein.

The orientation of the polycrystalline Pt layer is e.g. (111) Other orientations are also suitable as long as polycrystalline perovskite layers can be deposited on the surface. The decisive factor for this is that the Pt surface has crystallization points which allow the crystal growth of the perovskite phase.

According to the invention, preference is given to Si wafers with a $TiO_2$ adhesive layer and a polycrystalline Pt(111) layer applied on it. The Si wafer is preferably a Si(100) wafer.

The orientation of the Pt layer is enhanced by conventional methods, in particular by heating to a temperature of 800 to 900° C., preferably 850° C. for 5 to 10 min, preferably 8 min, e.g. under oxygen flow. The orientation of the Pt layer can also be achieved at lower temperatures for a correspondingly longer time.

The thickness of the adhesion layer is 2 to 10 nm, preferably 4 to 7 nm and particularly preferably 5 nm.

The thickness of the Pt(111) layer is 20 to 80 nm, preferably 30 to 70 nm and particularly preferably 50 nm.

The thickness of all layers is determined in the context of the invention by conventional methods, in particular by means of XRR (X-ray reflectometry) and SEM (scanning electron microscope images of the cross-section of the sample).

The catalyst according to the invention is preferably prepared by dissolving the starting metal salts in a suitable solvent in the desired quantitative ratio and stirring the solution under reflux for a time of about 0.5 to 2 hours, preferably about 1 hour. Thereby, a precursor solution according to the invention is obtained. By prolonged heating no difference in the mixed oxide is achieved, but it is also possible, e.g. for up to 24 h.

The starting metal salts are salts of Ba, Co and Ti in the desired quantity ratios. Salts are used which form oxides when heated under oxygen supply, e.g. salts of organic carboxylic acids, dicarboxylic acids or tricarboxylic acids, or other oxide-forming salts e.g. such as nitrates, ammonium salts or salts of amino acids, hydroxycarboxylic acids, carbonates, a β-diketonates, metal alkoxides, metal aminoalkoxides, sulfates and other oxide-forming salts known to the skilled person. Salts of carboxylic acids or dicarboxylic acids are preferred, e.g. acetates, propionates, oxalates, pentanedionates. Acetates and pentanedionates are particularly preferred. Suitably, salts of the same acids are used, but also salts of various acids, and salts obtained by reaction of the respective metals with alcohols, ether alcohols such as butoxyethanol, propoxyethanol, methoxyethanol and similar amines or amino alcohols in the respective solvents are suitable (e.g. Ba-diaminoethoxide in aminoethanol, see e.g. DOCUMENT 12). For example, acetates and pentanedionates are used together, e. g. barium acetate with cobalt acetate and titanium(IV)-oxide-bis-2,4-pentanedionate.

As solvents, common non-aqueous solvents can be used which are suitable according to the state of the art for dissolving salts. Mixtures of organic carboxylic acids with the corresponding anhydrides are preferably used, in particular, a mixture of propionic acid/propionic anhydride has proven to be favorable. The mixing ratio (by volume) of carboxylic acid to carboxylic acid anhydride is 10:1 to 1:1, preferably 7:1 to 4:1, particularly preferably 5:1. In this solvent mixture, the boiling point is about 140° C. under normal conditions, which is suitable to completely dissolve the salts.

The amount of solvent is chosen so that, after dissolution of all salts, a final concentration of 0.05 to 0.25 mol/l, preferably 0.10 to 0.20 mol/l, particularly preferably 0.15 mol/l based on the Ba cation is achieved. The molarity of the solution determines the crystal quality and layer thickness per deposition step. In general, 0.15 M solutions are used according to the invention.

The addition of $Co_3O_4$ in the final mixed oxide product is achieved by using an excess amount of the Co salt, in particular cobalt acetate, based on the perovskite phase.

The doping with Ti is achieved by addition of the corresponding salt of Ti, in particular Ti(IV)-oxide-bis(2,4-pentanedionate), in the desired amount.

The resulting precursor solution may, if desired, be filtered after cooling, e.g. over a 0.2 μm PTFE filter or other conventional filters. By filtering in particular a better layer quality is achieved in the subsequent spin coating process.

For the production of the anode according to the invention, the precursor solution thus obtained is applied to the substrate described above by conventional wet-chemical methods, preferably stepwise. Preferably, a spin coating method is used, but spray coating or dip coating methods, dripping, brushing, squeegeeing, rolling and other common methods are also possible.

After application of each layer, the coated substrate is heated to a temperature of about 250 to 400° C., preferably 300 to 380° C., particularly preferably 350° C., e.g. on a hot plate, during a few minutes, e.g. 1 to 5 min, preferably 2 min, and dried before the next layer of the precursor solution is applied. Preferably, at least 3 layers are applied, particularly preferably a total of 5 layers, but even more catalyst layers are possible. As many layers are applied until the desired total layer thickness of the catalyst layer is achieved.

Finally, the coated anode is baked for 5 to 12 minutes, preferably 6 to 10 minutes, more preferably 8 minutes, in the oxygen flow at about 700 to 1000° C., preferably 800 to 900° C., particularly preferably 850° C.

The thickness of the finally obtained catalyst layer on the substrate after baking is about 50 to 150 nm, preferably 80 to 130 nm, particularly preferably 100 nm. The layer thickness is determined by SEM as described above. This layer thickness is particularly suitable for laboratory tests. For industrial applications, larger layer thicknesses are common, which can also be produced according to the invention.

The anode thus obtained is a model for testing the material system and its properties. The oxidic catalyst according to the invention can be used in other commonly available anode systems on an industrial scale in electrolyzers, as well as in metal-air batteries.

The electrocatalyst according to the invention has, compared to the comparative catalyst PBCO, a service life which is more than eightfold increased and a current density increased by 20 mA/cm², as shown in the following example.

Scaling up the results of the following service life test to industrially relevant standards, a lifetime of 10 years of the electrode according to the invention with a layer thickness of only 83 μm is guaranteed. In industrial applications with higher operating voltages and electrolyte concentrations, even higher current densities are to be expected than in the example described below.

EXAMPLE

Production of the Precursor 0.288 g barium acetate, 0.396 g of cobalt acetate and 0.008 g of Ti(IV)-oxide-bis-(2,4-pentanedionate) are dissolved in 10 ml of propionic acid/propionic anhydride 5:1 (by volume). Thereby a 0.11 M solution based on the Ba cation is obtained. The solution is stirred at reflux for 1 h at 140° C. After cooling, it is filtered through a PTFE 0.2 μm filter.

Production of the Anode

A silicon wafer Si (100) is provided with a 5 nm thick adhesion layer ($TiO_2$) and a polycrystalline 50 nm thick Pt (111) layer, which is applied by magnetron sputtering. This substrate is baked at 850° C. for 8 minutes at 4 sccm $O_2$ flow to enhance the Pt (111) preferred orientation.

The precursor is then applied stepwise on the substrate. For this purpose, at first 200 μl of the precursor prepared above are applied to the substrate by spin coating. Thereafter, it is dried at 350° C. on a heating plate for 2 min. This procedure is repeated for further 4 runs, but only using 100 μl per run. Finally, it is baked at 850° C. for 8 minutes at 4 sccm $O_2$ flow. The catalyst layer now has a thickness of about 100 nm, determined by SEM.

Service Life Test (ESLT—End of Service Life Test)

In a service life test, the chemical stability was demonstrated under accelerated conditions of alkaline electrolysis. The exact procedure corresponds to that of DOCUMENT 11, in particular p. 157 FIG. 1.

Continuous CV-measurement cycles (cyclic voltammetry) with the sample at a scan rate of 100 mVs$^{-1}$ in a range of 1 V to 2.1 V were performed versus RHE. The anode according to the invention and, for comparison, a corresponding anode coated with $Pr_{0.2}Ba_{0.8}CoO_{3-\delta}$ (PBCO), which had been prepared in the same way and had the same thickness as the anode according to the invention, were used. The measurement was carried out in 1 M potassium hydroxide solution at 80° C. The result of the experiment at 2.04 V is shown in FIG. 1.

Figure 1:
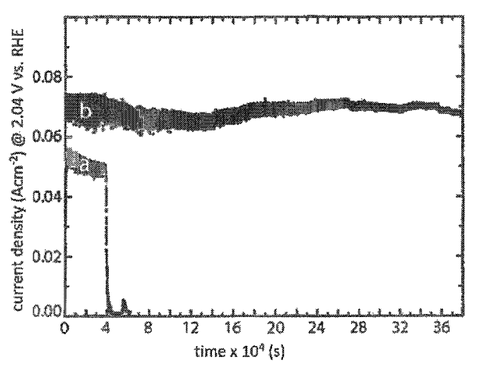
FIG. 1 shows the result of the service life test (ESLT—End of Service Life Test) with an anode according to the invention in comparison to a known PBCO anode. The current density (at 2.04 V vs. RHE) is shown as a function of the time of the $BaCoO_3$-based material systems (a) $Pr_{0.2}Ba_{0.8}CoO_3$ compared to the service life of the electrocatalyst prepared in the below-mentioned example shown as (b). Both samples are 100 nm thin and were tested in 1 M KOH at 80° C. The shown electrocatalyst (b) has an eight times increased service life and about 20 mA/cm² higher current densities compared to the comparison (a).

The water decomposition reaction restarts in every cycle and accelerates the decomposition of the catalyst until the catalyst is completely dissolved (FIG. 1b of DOCUMENT 11). At this point in the test, after some time, the peeling of Pt from the Si substrate by gas bubbles starts (FIG. 1c of DOCUMENT 11), followed by etching of the Si substrate (FIG. 1d of DOCUMENT 11), which results in a current density of 25 mA/cm$^2$ during Si-hydroxide etching. The ESLT graphs in DOCUMENT 11 show the current density at 2.04 V vs. RHE over time. The sharp current decrease in the graph indicates the end of service life. The test is associated with accelerated conditions compared to chronopotentiometric or amperometric methods, as the OER periodically restarts.

The anode according to the invention had a service life of 380,000 s with a constant course of the current density. After this time, the catalyst layer had completely dissolved. However, the comparison anode only had a service life of 40,000 s.

The electrocatalyst according to the invention has a more than eightfold increased service life and a current density increased by 20 mA/cm$^2$ compared to the comparison catalyst.

Scaling up these results to industrially relevant scales, a service life of 10 years of the electrode according to the invention is guaranteed with a layer thickness of only 83 μm. In industrial applications with higher operating voltages and electrolyte concentrations higher current densities are to be expected.

$BaCoO_{3-\delta}$ (BCO) is not suitable as an electrocatalyst since it passivates after a short operating time.

The invention claimed is:

1. A perovskite-based, electrically conductive, biphasic mixed oxide having a structure $ABO_3$ with A=Ba and B=Co, comprising additionally 5-45 at %, $Co_3O_4$ wherein the at % of Co is based on the total number of the Co-atoms in the perovskite $ABO_3$ and 0.5 to 3 at % Ti as dopant wherein the at % of Ti is based on the total number of Co-cations in the perovskite $ABO_3$.

2. The perovskite-based, electrically conductive, biphasic mixed oxide according to claim 1 having the structure $BaCo_{1-x}Ti_xO_{3-\delta}:Co_3O_4$ with x=0.005 to 0.03, wherein δ defines the oxygen vacancies in the perovskite structure and is in the range of about 0.1 to 0.8.

3. The perovskite-based, electrically conductive, biphasic mixed oxide according to claim 2 having a formula $BaCo_{0.98}Ti_{0.02}O_{3-\delta}:Co_3O_4$.

4. A catalyst for the oxygen evolution reaction in an alkaline environment comprising the perovskite-based, electrically conductive, biphasic mixed oxide according to claim 1.

5. An anode comprising the perovskite-based, electrically conductive biphasic mixed oxide according to claim 1, and an electrically conductive substrate material.

6. The anode according to claim 5, wherein the substrate material is a silicon wafer provided with a $TiO_2$ adhesive layer and a polycrystalline Pt(111) layer.

7. A method for catalyzing the oxygen evolution reaction by the catalyst according to claim 4 in an alkaline water electrolysis or in metal-air batteries.

8. A method for preparing an anode for an alkaline water electrolysis or metal-air batteries, wherein the anode comprises the electrically conductive perovskite-based biphasic mixed oxide according to claim 1.

9. A method for the production of a precursor for the electrically conductive biphasic mixed oxide according to claim 1 comprising:
   a) dissolving organic carboxylic acid, dicarboxylic acid and/or tricarboxylic acid salts and/or other oxide-forming salts of Ba and Co as well as Ti in a non-aqueous solvent,
   b) heating the solution under reflux, and
   c) filtering,
   characterized in that the addition of $Co_3O_4$ desired in the electrically conductive biphasic mixed oxide is adjusted by the correspondingly selected excess amount of Co with respect to the stoichiometric perovskite phase.

10. The method according to claim 9, wherein the salts of Ba and Co are selected from the group consisting of acetates, propionates, oxalates and pentanedionates and the salt of Ti is Ti(IV)-oxide-bis(2,4-pentanedionate).

11. The method according to claim 9, wherein the non-aqueous solvent is a mixture of propionic acid and propionic anhydride in the ratio (by volume) of 10:1 to 2:1.

12. A method for the production of an anode, characterized in that the precursor obtained by the method according to claim 9 is
   a) applied to an electrically conductive substrate in a wet coating process,
   b) dried, and
   c) baked,
   wherein the steps a) to c) are repeated until the desired layer thickness is achieved.

13. The method according to claim 12, wherein the wet coating process is selected from the group consisting of spin coating, spray coating and dip coating.

14. The method according to claim 12, wherein the drying is carried out at 250 to 400° C.

15. The method according to claim 12, wherein the baking is carried out at 700 to 1000° C.

16. The method according to claim 12, wherein the substrate is a silicon wafer coated with a $TiO_2$ adhesive layer and a polycrystalline Pt layer.

17. The method according to one or more of claim 12, wherein the thickness of a catalyst layer according to step c) is about 50 to 150 nm.

18. An amorphous mixed oxide having a Co:Ba ratio of about 2:1 and a TTB (Tetragonal Tungsten Bronze)-like near structure, obtainable by using the perovskite-based, electrically conductive, biphasic mixed oxide according to claim 1 as a catalyst in the oxygen evolution reaction of alkaline water electrolysis, wherein said amorphous product is formed by leaching out Ba.

19. A catalyst for the oxygen evolution reaction in an alkaline environment comprising the perovskite-based, electrically conductive, biphasic mixed oxide according to claim 3.

20. An anode comprising the perovskite-based, electrically conductive biphasic mixed oxide according to claim 3, and an electrically conductive substrate material.

* * * * *

UNITED STATES PATENT AND TRADEMARK OFFICE
CERTIFICATE OF CORRECTION

Page 1 of 1

PATENT NO. : 11,111,587 B2
APPLICATION NO. : 16/499537
DATED : September 7, 2021
INVENTOR(S) : Daniel Bick et al.

It is certified that error appears in the above-identified patent and that said Letters Patent is hereby corrected as shown below:

In the Claims

In Column 12, Line 4, delete: $CO_3O_4$
And replace it with: $Co_3O_4$

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*